Nov. 7, 1933.   W. A. TRYON   1,933,572
SELF LUBRICATING SPRING SHACKLE
Filed Nov. 14, 1930
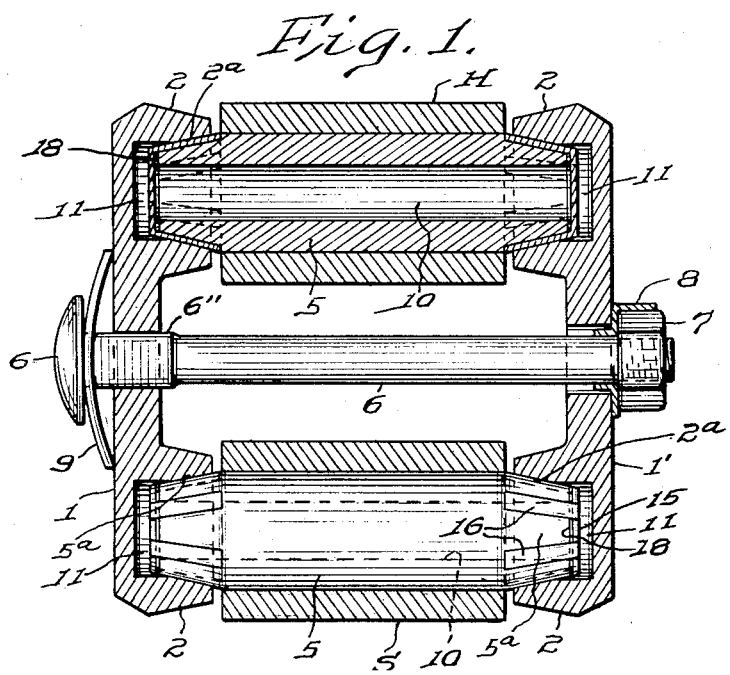
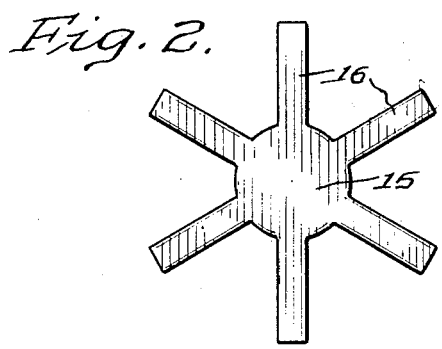
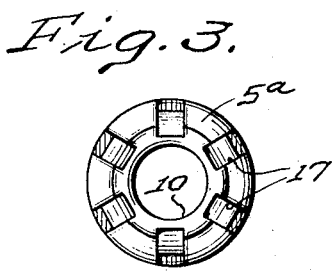
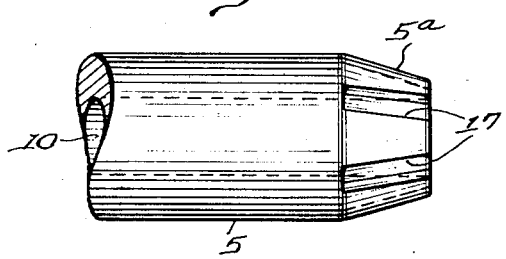
INVENTOR
William A. Tryon.
BY
ATTORNEYS
WITNESS
F. J. Hartman.

Patented Nov. 7, 1933

1,933,572

UNITED STATES PATENT OFFICE 1,933,572

SELF-LUBRICATING SPRING SHACKLE

William A. Tryon, Elmira, N. Y.

Application November 14, 1930
Serial No. 495,547

16 Claims. (Cl. 267—54)

My invention relates to automotive and like spring shackles, the principal object thereof being the provision of novel means for insuring constant and effective lubrication of the wearing parts of the shackle over long periods of time to the end that the necessity for periodic lubrication in order to keep the shackle in proper operative condition and prolong its life, with resulting trouble, loss of time and annoyance to the owner of the automobile on which the shackle is installed, may be entirely avoided.

A further object of the invention is the provision of a self lubricating shackle of such character that the lubricant may be inserted when the shackle is assembled at the factory in a quantity sufficient to insure adequate lubrication of the wearing parts for a period normally commensurate with the useful life of the automobile of which it forms a component part, and embodying means whereby the lubricant is automatically fed to and distributed upon the wearing surfaces during the relative movement therebetween when the car is in operation in such quantity and in such way as to effectively maintain the requisite oil film between them.

Still further objects of the invention are to provide a self lubricating spring shackle of the character aforesaid which can be readily and cheaply manufactured on a production basis at a cost but little in excess of that of the non-self lubricating shackles of generally similar type at present in use; which is no more liable to get out of order or become damaged under operating conditions than said shackles, and which readily may be utilized in place thereof without requiring any structural changes or modifications in the automobile of which they form component parts.

Still further objects, advantages, and novel features of construction and arrangement comprehended by my invention are hereinafter more particularly set forth or will be apparent to those skilled in the art from the following description of one embodiment of the invention as illustrated in the accompanying drawing.

While the principles of my invention may be readily adapted to and incorporated in various forms and types of shackles, they are particularly applicable to a shackle of the general type for which Letters Patent of the United States 1,534,193 were granted to me April 21, 1925, and I have therefore shown in the accompanying drawing and shall herein describe the invention as applied to and embodied in a well known commercial form of a shackle of that character.

In the said drawing, therefore, in which I have shown a shackle of the type to which reference has just been made but modified in accordance with the present invention, Fig. 1 is a central vertical section through the shackle with certain parts shown in elevation as it appears when operatively assembled for use; Fig. 2 is an elevation, on a somewhat larger scale than Fig. 1, of one of the component elements prior to assembly in the shackle; Fig. 3 is an end view, on the same scale as Fig. 2, of one of the shackle pins removed from the shackle and prior to assembly therewith of the element shown in Fig. 2, and Fig. 4 is a fragmentary elevation of the pin adjacent one end thereof. The same characters of reference are used to designate the same parts in the several figures.

The shackle shown in Fig. 1 which I have chosen as illustrative of a well known type of shackle which is particularly adapted for the purposes of the present invention, comprises, broadly considered, a pair of oppositely disposed side links 1, 1' provided at their respective ends with bosses 2 having conical pockets or cavities formed therein and defined by conical surfaces 2a, the inner ends of the pockets, however, being desirably cylindrical instead of conical. Disposed between the side links are hollow cylindrical pins 5 having conical ends tapered in correspondence with the conical surfaces 2a of the pockets and thus providing bearing surfaces 5a adapted to engage the corresponding surfaces of the pockets when the shackle is assembled, the ends of the pins being arranged to project for a short distance beyond the bearing surfaces 2a and thus into the cylindrical end portions of the pockets. The side links are maintained in operatively assembled relation with the pins through the medium of a bolt 6 extending transversely through them midway between their ends and threaded on its extremity for the reception of a nut 7 which is prevented from backing off by a lock washer 8, while beneath the head 6' of the bolt is disposed a suitable spring 9 which bears against the adjacent side link and is effective to yieldingly draw the conical bearing surfaces 2a in the links against the corresponding conical surfaces 5a of the pins and maintain proper bearing engagement therebetween; to prevent the bolt from turning axially a portion 6'' thereof adjacent the head may be made elliptical in cross section and the hole in the link correspondingly shaped. When a shackle of this character is assembled in an automobile, one of the pins 5 is disposed in the eye of one of the springs S and the other pin in the spring hanger H or other part of the automobile to be connected with that spring through the medium of the shackle, the pins being pressed into place or otherwise non-rotatably secured in the spring and hanger respectively so as to be operatively rigid therewith.

Since shackles of this general type are in extensive commercial use, further description thereof herein would be superfluous.

Due to the flexing of the spring S when the vehicle is in operation, the conical surfaces 5a of the pins are caused to oscillate relatively to and upon the conical surfaces 2a of the pockets, and in order to maintain a film of lubricant between these surfaces so as to effect the necessary lubrication thereof, it has heretofore been customary to provide one of the side links with lubricating nipples aligned with the axes of the pins to enable oil or other suitable lubricant to be forced into the central chambers 10 in the pins, which act as reservoirs, and the clearance spaces 11 between the bottoms of the pockets and ends of the pins, and to provide either or both of said bearing surfaces with annularly spaced oil grooves through which the lubricant so introduced can work up to points from which it can readily be distributed over the said surfaces by their said relative movement.

This method of lubrication, however, is necessarily disadvantageous in that new lubricant must be introduced periodically as it is impossible to regulate the feed of the lubricant to the bearing surfaces in an amount just sufficient to insure proper lubrication thereof; in consequence, an excessive quantity of lubricant is constantly being transferred thereto when the car is in operation and thereafter rapidly works out of the ends of the pockets and is lost, so that the supply in the reservoirs and pockets must be renewed relatively frequently, although the capacity of the former is such that if only that quantity of lubricant were fed therefrom which is actually needed for the effective lubrication of the bearing surfaces, sufficient lubricant could be initially placed therein to insure the proper and adequate lubrication of the said surfaces over very long periods of time; of this fact I take advantage in carrying out the present invention.

In accordance therewith I fill the chamber or reservoir 10 in each of the shackle pins prior to their assembly in the shackle with oil or other suitable lubricant and then seal the ends of the pins by means operative to retain the oil in the reservoir save only as it is fed through the medium of the said means to the adjacent bearing surfaces of the pin and the side links in quantities just sufficient to insure their effective lubrication. More particularly, I provide sealing means formed of one of the oil-absorptive metals which have recently been developed for the purpose of providing a metal suitable for bearings and the like yet with a capacity for absorbing oil; these metals are going into extensive use in the automotive and other industries, and since they partake of the general character of bearing bronze with the added capacity just referred to, I shall for convenience, but not by way of limitation or restriction, refer to them herein as "porous bronzes".

Thus, in accordance with the preferred practice of my invention, I stamp or otherwise form from a sheet of one of these porous bronzes spiders of the character of that shown in Fig. 2, the central portion 15 of each spider being substantially circular and of suitable diameter to overlie an end of the bearing pin 5; from this central portion radiate a plurality of arms 16 desirably of substantially the same length as the tapered ends of the pin. I also provide the latter with a plurality of longitudinally extending grooves 17 annularly spaced about the surface 5a, the grooves corresponding in width and in number to the arms with which the spider is provided and approximating in depth the thickness thereof, with the result that when the central part of the spider is seated against the end of the pin the several arms of the former can be bent up and seated in the grooves; these grooves can be milled or formed in any other suitable way in the conical surfaces of the pin and are of such size that the spider arms will form a very snug fit therein.

In some cases it may be possible to so tightly seat the central part of each spider against the adjacent end of the pin as to negative or substantially negative leakage of oil from the reservoir between the end of the pin and the annular surface of the spider in contact therewith, but to insure against such leakage at this point I prefer to dispose a very thin annular band of solder 18 between the end of the pin and the spider while leaving the central part of the latter, which is aligned with the end of the reservoir 10, devoid of solder and thus adapted to absorb oil from the supply contained in the pin; in other cases I may braze the spider to the end of the pin instead of applying solder between the parts or in fact may use any suitable means or method for preventing leakage of oil between the ends of the pin and the adjacent portions of the spiders. Generally, however, the use of solder will be found most convenient for it can be applied very easily by first "tinning" both ends of the pin, then assembling a spider over one of the ends thereof by bending its arms down into the adjacent grooves in the pin, and finally heating the center of the spider to cause the solder to fuse itself thereto. The oil can then be introduced at the other end of the pin while the latter is maintained in vertical position, the spider at that end thereafter applied in a generally similar way, and the solder finally fused so as to unite that spider with the pin. The arms of both spiders which are initially desirably slightly thicker than the depth of the grooves 17 are then smoothed off in any convenient way so as to bring them into coincidence with the conical surfaces 5a of the pin, thereby causing the latter to present alternate zones of the metal, usually steel, of which the pin is made and of the porous bronze, and placing the pin in condition for assembly in the shackle.

The central part of each spider over the area bounded by the solder 18 is therefore maintained in continuous contact with the oil within the pin, and because of the capacity of the metal of which the spider is made to absorb oil becomes impregnated therewith and remains in this condition as long as any oil is contained in the reservoir, while from the said central part of the spider the oil is carried by capillary action into and ultimately impregnates the arms thereof. As relative oscillation between the shackle pin and the bearing surfaces 2a in the side links occurs when the automobile is in operation, some of the oil contained in the arms of the spiders is thereupon wiped over the bearing surfaces 2a first in one direction and then in the other, the number of arms utilized and their width being preferably so calculated that all or substantially all of each such bearing surface will be traversed by the arms so that the oil will be spread therefrom over the entire area of the bearing surface 2a when the oscillation between it and the adjacent pin is of the average extent incident to the normal running conditions encountered by the automobile of which the shackle forms a component part. In this way, adequate lubrication of the bearing surfaces of the pin and side links is maintained as long as any oil remains in the reservoir, and since the feed thereof through the porous spiders is very gradual and as the reservoirs can be made relatively large, one filling of the latter is frequently sufficient to take care of the lubrication requirements of the shackle through the normal operating life of the automobile or at least for so long a period that the refilling of the pins or, preferably, replacement of the latter with new ones which have been filled and assembled at the factory, is only required at such long intervals that the expense incident thereto is of no moment to the automobile owner.

An especially advantageous feature of my invention resides in the fact that as the oil is only fed to the bearing surfaces when relative movement occurs therebetween, and then only because of the capacity of the porous spiders to absorb oil from the reservoir and distribute it to said surfaces through their arms, no leakage or waste of oil can occur when the vehicle is at rest, with the result that the supply in the reservoir is conserved to the maximum extent since it is only utilized when the automobile is in motion and lubrication of the bearing surfaces consequently required.

While I have herein shown and described one form of my invention with considerable particularity, it will be understood that I have done so by way of example merely to thereby enable those skilled in the art to comprehend and practice the invention, and that the principles thereof may be as readily applied to and embodied in shackles or analogous bearing assemblies comprising relatively movable members of types other than that to which I have chosen to refer, while the details of design, construction and arrangement of the various parts may be modified in numerous particulars if desired without departing from the spirit and scope of the invention as defined in the appended claims.

Having thus described my invention, I claim and desire to protect by Letters Patent of the United States:

1. A self lubricating spring shackle, comprising a pin provided with an internal oil reservoir and having a bearing surface at each end, a pair of side links having bearing surfaces respectively cooperative with said surfaces on the pin, and oil absorptive means carried by the pin, fixed with respect thereto and forming seals for the ends of the reservoir operative to absorb oil therefrom and convey it to the vicinity of the adjacent bearing surfaces.

2. A self lubricating spring shackle, comprising a transversely extending hollow pin having a bearing surface adjacent its end, a side link provided with a bearing surface cooperative with the bearing surface on the pin, and means formed of oil absorptive metal associated with the end of the pin and fixed with respect thereto adapted to absorb oil from the chamber in its interior and convey it to the vicinity of the adjacent bearing surfaces.

3. A self lubricating spring shackle, comprising a transversely extending hollow pin provided with an oil reservoir and having adjacent each end a conical bearing surface, a pair of side links respectively provided with bearing surfaces cooperative with the said surfaces of the pin, and means formed of oil absorptive metal extending over the ends of the pin to seal the reservoir therein against leakage of oil and operative to absorb oil from said reservoir and carry it to the vicinity of the adjacent bearing surfaces.

4. A self lubricating spring shackle, comprising a pin having a chamber extending axially therethrough and forming an oil reservoir and a conical bearing surface adjacent each end provided with a plurality of annularly spaced grooves, a spider formed of oil absorptive metal disposed adjacent each end of the pin to seal the chamber therein against oil leakage and having its arms disposed in said grooves, and a pair of side links provided with conical bearing surfaces respectively cooperative with the corresponding bearing surfaces of the pin.

5. A self lubricating spring shackle, comprising a pin having a chamber extending axially therethrough and forming an oil reservoir and a tapered bearing surface adjacent each end provided with a plurality of grooves, a spider having an annular central portion and a plurality of arms disposed adjacent the end of the pin, said central portion forming a closure for the adjacent end of the chamber and the arms of the spider being seated in said grooves, and a pair of side links respectively provided with conical bearing surfaces cooperative with the corresponding surfaces of the pin.

6. In a self lubricating spring shackle, a pin having a chamber forming an oil reservoir extending axially therethrough, and a bearing surface adjacent an end thereof, said bearing surface being provided with a plurality of annularly spaced grooves, and a spider formed of oil absorptive material and having a disk-like center and a plurality of radially extending arms disposed adjacent said end with the central portion of the spider forming a closure for said chamber and said arms extending into said grooves.

7. In a self lubricating spring shackle, a pin having a chamber forming an oil reservoir extending axially therethrough and a bearing surface adjacent an end thereof, said bearing surface being provided with a plurality of annularly spaced grooves, and a spider formed of oil absorptive material and having a disk-like center and a plurality of radially extending arms disposed adjacent said end with the central portion of the spider forming a closure for said chamber and said arms extending into said grooves and lying substantially flush with said bearing surface.

8. In a self lubricating spring shackle, a pin having an internal chamber forming an oil reservoir and a grooved bearing surface adjacent one of its ends, an element formed of oil absorptive material having a central substantially circular portion seated over said end and forming a closure for the chamber and radially extending arms respectively seated in said grooves, and means permanently uniting said central portion with the end of the pin.

9. In a self lubricating spring shackle, a pin having an internal chamber forming an oil reservoir and a bearing surface adjacent one of its ends provided with a plurality of grooves, an element formed of oil absorptive material having a central substantially circular portion seated over said end and forming a closure for the chamber and radially extending arms respectively seated in said grooves, and an annular band of solder interposed between and uniting the end of the pin and the central portion of the element.

10. In a self lubricating spring shackle, a pin having an internal chamber forming an oil reservoir and a bearing surface adjacent one of its ends provided with a plurality of grooves, an element formed of oil absorptive material having a central substantially circular portion seated over said end and forming a closure for the chamber and radially extending arms respectively seated in said grooves, and an annular band of non-oil absorptive metal interposed between and uniting the end of the pin and the central portion of the element.

11. In a spring shackle, the combination with two relatively movable members respectively provided with surfaces in mutual bearing engagement, one of said members comprising an oil reservoir open at one end, of oil-absorptive means extending across the reservoir in axial alignment therewith to seal said end against leakage but operative to absorb oil from the reservoir to effect lubrication of said surfaces.

12. In a spring shackle, the combination with two relatively movable members respectively provided with surfaces in mutual bearing engagement, one of said members comprising an oil reservoir, of oil-absorptive means operative to seal said reservoir against oil leakage but adapted to absorb oil therefrom, and means integral with said oil-absorptive means extending outwardly therefrom between said surfaces operative to distribute the oil so absorbed from the reservoir.

13. The combination with two relatively movable members respectively provided with surfaces in mutual bearing engagement, one of said members comprising an oil reservoir, of oil-absorptive means operative to seal said reservoir against oil leakage but adapted to absorb oil therefrom and comprising means operative to convey the absorbed oil to a plurality of circumferentially spaced points adjacent one of said surfaces.

14. In a self lubricating bearing assembly, a pin having an internal chamber forming an oil reservoir and a bearing surface adjacent one of its ends provided with a groove, an element formed of oil-absorptive material having a central portion forming a closure for the chamber and a radially extending portion seated in said groove, said element being permanently united with the pin.

15. A self lubricating bearing assembly comprising a pin provided with an internal oil reservoir and having a bearing surface, an element having a bearing surface cooperative with the bearing surface on the pin, and an element of porous metal carried by and axially aligned with the pin operative to form a seal for an end of the reservoir against leakage of oil but adapted to absorb oil from the reservoir and convey it to a point adjacent said surfaces.

16. A self-lubricating bearing assembly comprising a pin having a bearing surface and provided with an internal lubricant reservoir extending axially from one end of the pin to the other, an element having a bearing surface cooperative with the bearing surface of the pin and means carried by and fixed with respect to the pin forming a seal for one end of the reservoir against leakage of lubricant but adapted to absorb lubricant from the reservoir for conduction to said surfaces.

WILLIAM A. TRYON.